(12) United States Patent
Weres

(10) Patent No.: US 8,650,876 B2
(45) Date of Patent: Feb. 18, 2014

(54) METHOD AND DEVICE TO REMOVE HYDROGEN SULFIDE FROM STEAM CONDENSATE IN A GEOTHERMAL POWER GENERATING UNIT

(75) Inventor: Oleh Weres, Gardnerville, NV (US)

(73) Assignee: ChemTreat, Inc., Glen Allen, VA (US)

( * ) Notice: Subject to any disclaimer, the term of this patent is extended or adjusted under 35 U.S.C. 154(b) by 198 days.

(21) Appl. No.: 13/050,843

(22) Filed: Mar. 17, 2011

(65) Prior Publication Data

US 2011/0225971 A1   Sep. 22, 2011

Related U.S. Application Data

(60) Provisional application No. 61/315,010, filed on Mar. 18, 2010.

(51) Int. Cl.
| | |
|---|---|
| F03G 7/00 | (2006.01) |
| F01K 9/00 | (2006.01) |
| C01B 17/02 | (2006.01) |
| C02F 1/00 | (2006.01) |

(52) U.S. Cl.
USPC .. 60/641.2; 60/685; 423/573.1; 423/DIG. 19; 210/747.1

(58) Field of Classification Search
USPC ............. 60/641.1–641.8, 685–694; 210/750, 210/696–698, 743, 747; 423/220, 234, 238, 423/DIG. 19
See application file for complete search history.

(56) References Cited

U.S. PATENT DOCUMENTS

| | | | | |
|---|---|---|---|---|
| 1,851,987 | A | | 4/1932 | Schwab et al. |
| 1,964,487 | A | | 6/1934 | Smith |
| 3,476,534 | A | * | 11/1969 | Buswell et al. ............. 48/94 |
| 3,731,488 | A | * | 5/1973 | Sasakura et al. ............ 60/645 |
| 4,363,215 | A | * | 12/1982 | Sharp ....................... 60/641.2 |
| 4,402,713 | A | * | 9/1983 | Domahidy .................. 95/263 |
| 4,410,432 | A | * | 10/1983 | Domahidy .................. 210/750 |
| 4,766,730 | A | * | 8/1988 | Amano et al. ............. 60/641.5 |
| 4,967,559 | A | * | 11/1990 | Johnston ................... 60/641.2 |
| 5,911,853 | A | | 6/1999 | Borrel |
| 5,965,031 | A | * | 10/1999 | Kitz et al. .................. 210/696 |
| 6,375,907 | B1 | * | 4/2002 | Gallup ....................... 423/571 |

\* cited by examiner

*Primary Examiner* — Thomas Denion
*Assistant Examiner* — Laert Dounis
(74) *Attorney, Agent, or Firm* — Oleh Weres (57) ABSTRACT

Ammonia sometimes present in geothermal steam increases the solubility of hydrogen sulfide in the steam condensate produced by the surface condenser in a steam cycle geothermal power generating unit by reacting with the hydrogen sulfide to produce nonvolatile ammonium bisulfide. The condenser vent gas also produced contains carbon dioxide. Contacting the steam condensate with the condenser vent gas at a pressure slightly greater than atmospheric causes carbon dioxide to dissolve in the condensate, decreasing pH and converting bisulfide ion back to hydrogen sulfide. Subsequently exposing the acidified condensate to condenser vacuum strips the hydrogen sulfide from the condensate, eliminating the need for further chemical treatment of the condensate to prevent air pollution. Hydrogen sulfide partitioning performance is further improved by converting the hydrogen sulfide in the vent gas to sulfur dioxide before contacting it with the condensate.

20 Claims, 6 Drawing Sheets

METHOD AND DEVICE TO REMOVE HYDROGEN SULFIDE FROM STEAM CONDENSATE IN A GEOTHERMAL POWER GENERATING UNIT

RELATED PATENT APPLICATIONS

Benefit is claimed of Provisional Patent Application 61/315,010 filed Mar. 18, 2010.

FIELD OF THE INVENTION

A method and device are provided to remove hydrogen sulfide from the steam condensate in a geothermal power generating unit, thereby decreasing the cost of air pollution control.

BACKGROUND OF THE INVENTION

The majority of steam turbine equipped geothermal power generating units are equipped with surface condensers. Because the volume ratio of condensate to vent gas is small, most of the noncondensible gases in the steam—including hydrogen sulfide ($H_2S$)—leave the condenser with the condenser vent gas. Well established processes (Stretford, LoCat, SulFerOx, combustion, regenerative thermal oxidation, etc., hereinafter "primary $H_2S$ abatement") are employed to remove essentially all of the $H_2S$ from the vent gas before it is vented to the atmosphere, thereby preventing air pollution by toxic and extremely malodorous $H_2S$.

This simple and usually highly effective method of controlling air pollution becomes much less effective when the steam contains ammonia; notably, in the very large dry steam field in Sonoma County and Lake County, Calif. Ammonia—which is a base—reacts with $H_2S$—which is a weak acid—to produce a nonvolatile salt (ammonium bisulfide, $NH_4SH$) which remains dissolved in the condensate:

$$H_2S + NH_3 \rightarrow HS^- + NH_4^+ \tag{1}$$

As a result, a substantial fraction of the $H_2S$ (as much as 35%) leaves the condenser dissolved in the condensate instead of with the vent gas. Most of the steam condensate is provided to the cooling tower as make-up water, and—if not further treated—most of the $H_2S$ in the condensate would be released from the cooling tower to the atmosphere, causing air pollution.

Several methods have been implemented to minimize release of $H_2S$ from the cooling tower, but each has drawbacks.

1. The $H_2S$ dissolved in the condensate can be destroyed using chemical oxidation, commonly employing hydrogen peroxide, which is unstable, hazardous and expensive and requires expensive storage tanks and pumps to keep it from decomposing, potentially in an explosive manner. This method of so-called secondary $H_2S$ abatement significantly increases the cost of power generated.

2. A catalyst—iron complexed with EDTA, HEDTA or another chelating agent—can be added to the cooling water to catalyze reaction of the $H_2S$ with oxygen dissolved in the cooling water before it is released to the atmosphere. Because a 2:1 or greater mole ratio of catalyst to $H_2S$ dissolved in the cooling water is required, the consumption and cost of the catalyst (which is lost with cooling tower blowdown and through gradual decomposition) can be large when the amount of $H_2S$ dissolved in the condensate is large. Also, colloidal sulfur produced by the oxidation reaction and iron oxide from decomposition of the catalyst produce sediment and deposits that foul the condenser tubing, decreasing thermal efficiency of the power generating unit and necessitating periodic outages to clean the condenser and cooling tower.

3. When the amount of $H_2S$ in the condensate is small, microbes present in the cooling water are able to consume most of the $H_2S$ before it is emitted from the cooling tower. An appropriate population of microbes must be maintained in the cooling water for this approach to work, requiring tight control of biocide usage. If too little biocide is added to the cooling water, microbes proliferate and foul the condenser tubes and tower fill. If too much biocide is added, the population of microbes decreases to the point that $H_2S$ is emitted to the atmosphere. Also, microbial oxidation of $H_2S$ produces colloidal sulfur. Even with tight control, some amount of $H_2S$ is emitted to the atmosphere, and deposits of biomass and sulfur in the condenser tubes require periodic cleaning.

Therefore, the geothermal industry has devoted much effort to decreasing the amount of $H_2S$ that dissolves in the condensate; indeed, surface condensers are commonly employed precisely because they put a larger fraction of the $H_2S$ into the vent gas as compared to contact condensers, despite the fact that surface condensers are more expensive and less efficient in terms of power generation than are contact condensers and require more maintenance.

In all cases, carbon dioxide is the major impurity present in geothermal steam and is a major constituent of the condenser vent gas. A small fraction of the $CO_2$ present in the steam dissolves in the condensate inside the condenser, and a small fraction of the $CO_2$ dissolved in the condensate reacts with water to produce carbonic acid, which is a much stronger acid than $H_2S$:

$$CO_2 + H_2O \rightarrow H_2CO_3 \quad K < 0.002 \tag{2}$$

The carbonic acid reacts with the ammonium bisulfide in the condensate converting it back to $H_2S$ which partitions into the vent gas:

$$H_2CO_3 + HS^- \rightarrow H_2S + HCO_3^- \tag{3}$$

In principle, the presence of $CO_2$ dissolved in the condensate might be expected to prevent $H_2S$ from dissolving in the condensate. Because the solubility of $CO_2$ in warm water is small and the partial pressure of $CO_2$ inside the condenser is small, very little $CO_2$ actually dissolves in the condensate. Furthermore, the reaction of $CO_2$ with water to produce carbonic acid is slow in relation to the limited time is available for the reaction to take place before the condensate falls out from the two phase region inside the condenser and into the hotwell. For this reason, the $CO_2$ in the steam actually has little effect upon the solubility of $H_2S$ in the condensate, and fails significantly to decrease the cost and complications of secondary abatement.

PRIOR ART

Schwab et al. U.S. Pat. No. 1,851,987 teach removing dissolved sulfides from waste water generated in connection with sulfur mining using the Frasch process by contacting the waste water with a gas stream that contains carbon dioxide. Smith U.S. Pat. No. 1,964,487 teaches a similar process, wherein the waste water is air stripped after being contacted with combustion flue gas containing carbon dioxide.

Domahidy U.S. Pat. No. 4,402,713 teaches removing hydrogen sulfide from steam condensate in a geothermal power generating unit having two stages of steam jet ejectors by using the entire volume of condenser vent gas mixed with steam flowing out of the first stage jet ejector to steam strip the condensate in a stripping tower at essentially constant pressure approximately equal to the exhaust pressure of the first stage steam jet ejector.

Domahidy U.S. Pat. No. 4,410,432 teaches compressing a fraction of the condenser vent gas after it has been treated to remove $H_2S$ and contacting it in a countercurrent manner with a fraction of the condensate extracted from the main condenser in an absorber column at a pressure greater than ten atmospheres, whereby part of the $CO_2$ in the treated condenser vent gas dissolves in the condensate, and a small fraction of the dissolved $CO_2$ reacts to form carbonic acid. The condensate containing dissolved $CO_2$ and carbonic acid is then sprayed over the top of the tube bundles inside the main condenser. In this manner carbonic acid is added to the condensate as it condenses in the tube bundles, decreasing pH and preventing $H_2S$ from dissolving in the condensate as ammonium bisulfide. Domahidy teaches (at 3:20-22) that "the major portion" of the condensate flowing out of the main condenser goes directly from the main condenser to the cooling water system. Thus, less than one-half of the condensate is contacted with condenser vent gas in the absorber column. In a practical implementation of Domihidy's invention much less than one-half of the condensate would go to the absorber column in order to minimize pumping costs and avoid flooding of the heat exchange tubes when the acidified condensate is returned to the condenser and sprayed over the tube bundles.

Borrel U.S. Pat. No. 5,911,853 teaches removing $H_2S$, mercaptans and other volatile sulfides from paper mill condensate by injecting $CO_2$ into the condensate stream under pressure greater than atmospheric and preferably in the range 30 to 100 psig, then rapidly reducing pressure thereby causing $H_2S$ and other sulfides to pass from the $CO_2$-enriched condensate to a gas phase. Borrel teaches the second, reduced pressure as being equal to atmospheric or slightly above.

SUMMARY OF THE INVENTION

The invention disclosed herein is a method and device that can be called a "condensate scrubber" which removes most of the $H_2S$ from the steam condensate in a geothermal power generating unit.

A simple installation of the condensate scrubber would require:

(a) A gas absorber that operates at a first pressure slightly greater than atmospheric,
(b) Means for conveying a fraction of the condenser vent gas to the gas absorber,
(c) A vapor/liquid separator connected to the main condenser and maintained at a second pressure substantially equal to the pressure in the main condenser, and
(d) A second condensate pump to remove the treated condensate from the vapor/liquid separator and deliver it to the cooling water system (that is, in addition to the condensate pump that removes steam condensate from the main condenser and is always present in a steam cycle generating unit).

The first condensate pump removes condensate containing dissolved $H_2S$ from the hotwell of the condenser and brings it up to a first pressure slightly greater than atmospheric. This condensate is contacted with a fraction of the condenser vent gas at this first pressure with a contact time sufficiently long to allow $CO_2$ in the vent gas to dissolve in the condensate and react with water to produce carbonic acid which then reacts with bisulfide ion converting the bisulfide to $H_2S$. The gas saturated, mildly acidic condensate is then exposed to the second, lower pressure, whereby a vapor phase separates from the condensate, and the $H_2S$ and other gases dissolved in the condensate partition into the vapor phase which flows back to the main condenser. By this means most of the $H_2S$ is removed from the condensate and returned to the main condenser, and is ultimately destroyed in the primary abatement system. Finally, the second condensate pump removes the condensate from the gas separator and conducts it to the cooling tower.

The $H_2S$ partitioning performance of the condensate scrubber can be improved by employing two or more stages of gas absorption, by employing two or more stages of vapor separation, by increasing the temperature of the condensate to increase the volume ratio of vapor to liquid when it is depressurized, by steam scrubbing the condensate at the second, lower pressure, or by adding $SO_2$ or another acid to the condensate to further decrease condensate pH, thereby further decreasing the solubility of $H_2S$ in the condensate.

DESCRIPTION OF THE INVENTION

Figure 1:
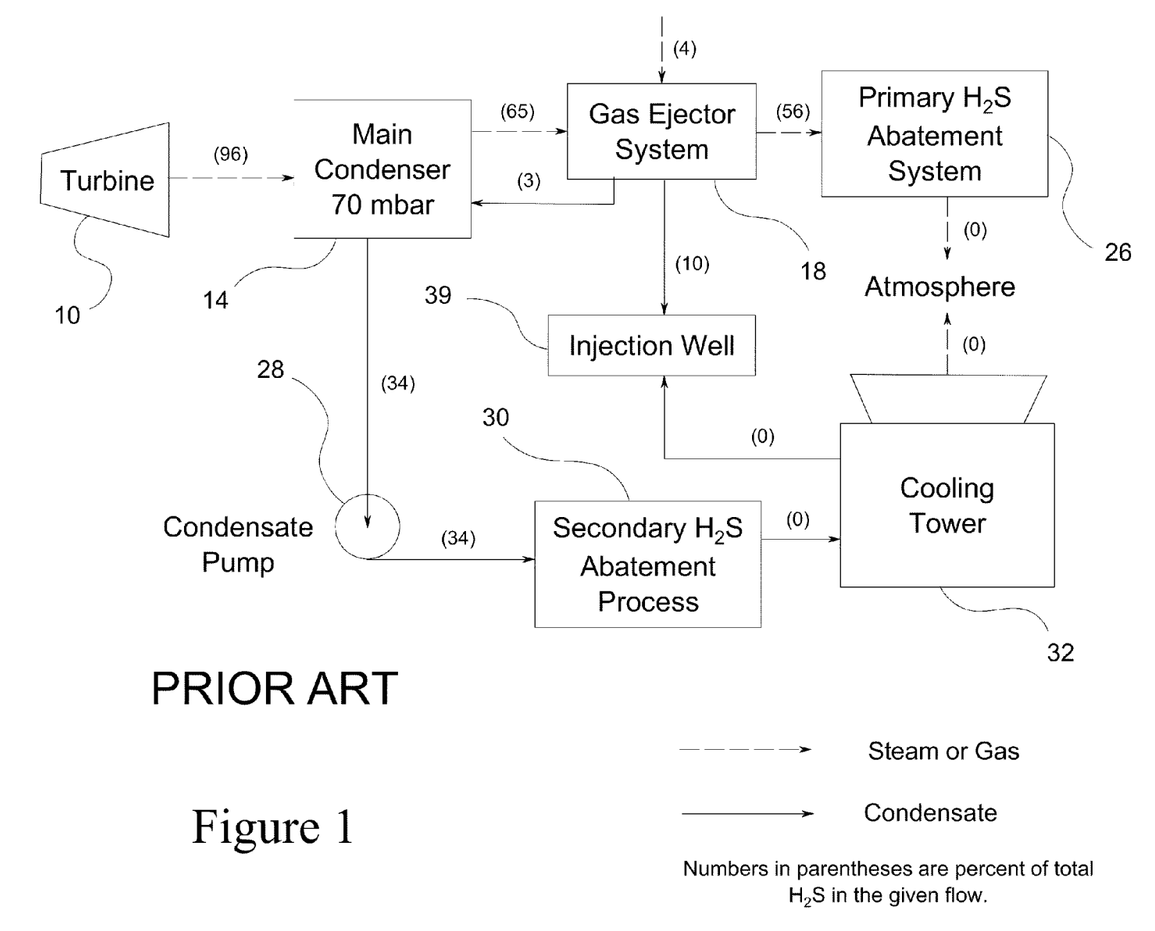
FIG. 1 depicts the prior art in simplified form: a geothermal power generating unit equipped with a surface condenser and provision for primary and secondary abatement of $H_2S$.

FIG. 1 depicts the prior art in simplified form: a geothermal power generating unit equipped with a surface condenser and provisions for primary and secondary abatement of $H_2S$, but no condensate scrubber. A complete geothermal power plant would comprise one or more such generating units.

In FIG. 1, solid arrows represent flows of liquid (that is, condensate). Dashed arrows represent flows vapor, steam or gas. Steam flows from turbine 10 to main condenser 14 which comprises a large vacuum chamber with one or more tube bundles inside of it. Condensate pump 28 removes the condensate from the main condenser. Gas ejector system 18 removes condenser vent gas containing $CO_2$ and $H_2S$ from the main condenser, brings it up to slightly above atmospheric pressure, and conducts it to primary $H_2S$ abatement system 26 which removes $H_{2S}$ from the vent gas before releasing it to the atmosphere. The seal water flowing out of the vacuum pump contains the highest concentration of $H_2S$, and is delivered untreated to injection well 39. The bulk of the condensate is delivered to cooling tower 32 as make-up water. The chemical reactions that comprise secondary abatement process 30 take place as the condensate flows to the cooling tower.

Each arrow is labeled with a number enclosed in parentheses which represents the percent of total $H_2S$ entering the power generating unit that is carried by that particular flow of steam, condensate or vapor. These mass flows of $H_2S$ were calculated in reference to a geothermal power generating unit of contemporary design, assuming the steam composition in Table 1.

Figure 2:
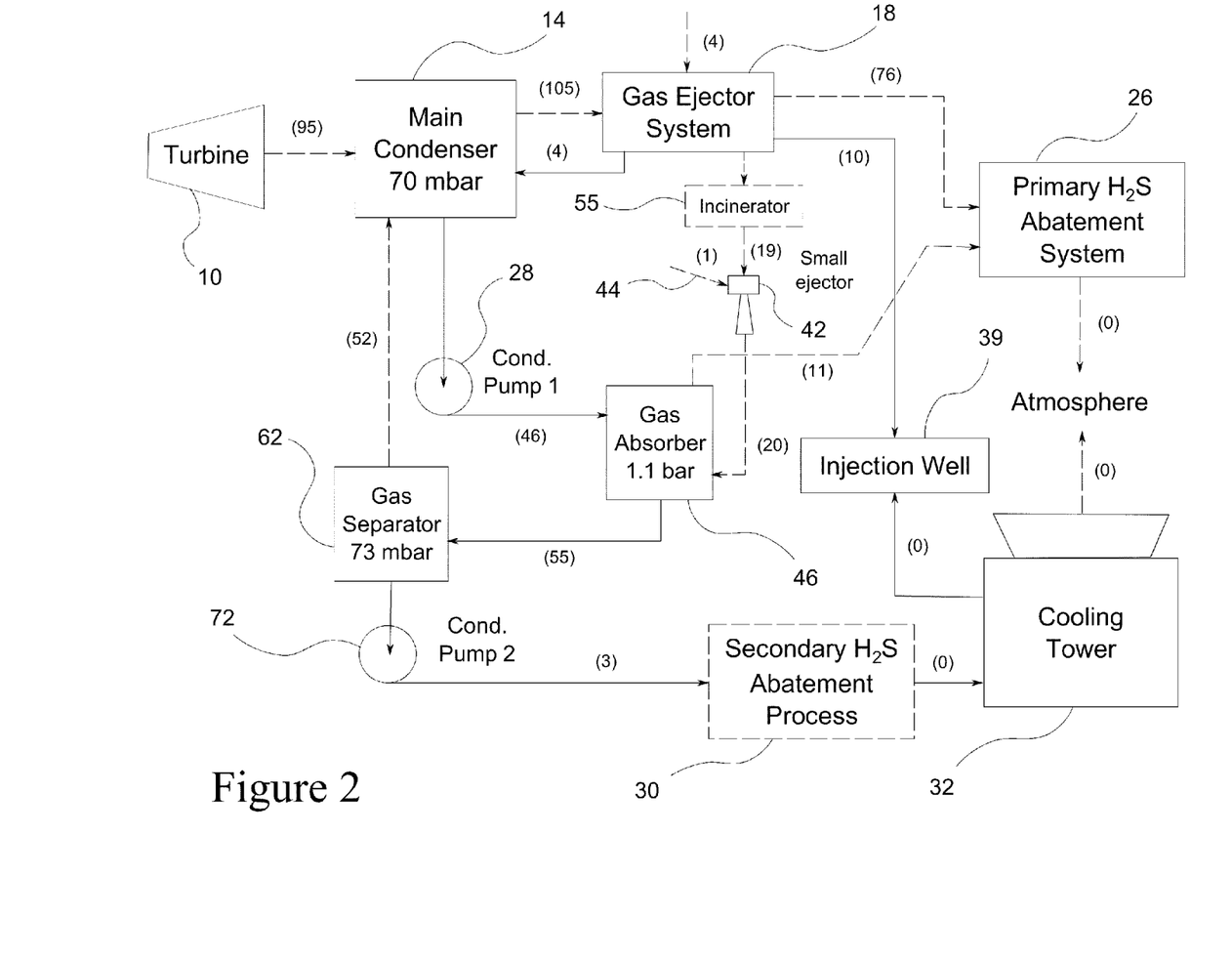
FIG. 2 is a simplified schematic of a power generating unit equipped with a condensate scrubber.

FIG. 2 depicts the same geothermal power generating unit with the condensate scrubber implemented in its simplest, essential form. First condensate pump 28 removes the condensate from main condenser 14 and delivers it to gas absorber 46. This pump is selected to provide sufficient head to get the condensate out of the hot well of the condenser and into gas absorber 46; the power consumed by this pump is one of the parasitic loads aggregated in Table 4. Small steam jet ejector 42 diverts a fraction (typically about 20%) of the condenser vent gas exiting gas ejector system 18 to gas absorber 46 where the vent gas contacts the condensate slightly above atmospheric pressure, allowing a substantial fraction of the $CO_2$ in the vent gas to dissolve in the condensate. Because the pressure in gas absorber 46 will typically be at least ten times greater than the operating pressure in main condenser 14, at least ten times more $CO_2$ will dissolve in the condensate than dissolved when condensate first formed inside main condenser 14. Gas absorber 46 provides sufficient residence time for the reaction of dissolved $CO_2$ with water producing carbonic acid (reaction 2 above) to approach equilibrium, thereby decreasing the pH of the condensate and converting practically all of the bisulfide ion in the condensate to $H_2S$ (reaction 3 above). The gases not absorbed (less soluble gases like $N_2$, $CH_4$, $H_2$ and a fraction of the $CO_2$) are conducted to primary $H_2S$ abatement system 26 together with the rest of the gas stream from gas ejector system 18.

The acidified condensate then flows to gas separator 62 which is connected to main condenser 14 whereby the pressure in gas separator 62 is substantially equal to or just slightly greater than the pressure in main condenser 14. Upon being exposed to the low pressure in gas separator 62 the acidified condensate containing dissolved gases separates into two phases whereby most of the $CO_2$ and $H_2S$ dissolved in the condensate partition into the vapor phase. This vapor flows into main condenser 14, and is subsequently removed from main condenser 14 by the gas ejector system 18A, 18B, 18C and delivered to primary $H_2S$ abatement system 26. The liquid phase is removed from gas separator 62 by second condensate pump 72 and delivered to cooling tower 32 where it serves as cooling water make-up. In this way most of the $H_2S$ initially dissolved in the condensate when it leaves main condenser 14 is stripped from the condensate and ultimately goes to primary $H_2S$ abatement system 26 where it is destroyed, and a much smaller amount of $H_2S$ goes to secondary abatement process 30 and cooling tower 32; indeed, secondary abatement is optional and may no longer be needed.

Second condensate pump 72 is selected to provide the head necessary to get the condensate out of the main condenser and to the cooling tower; thus, this condensate pump consumes the same power as the single condensate pump of prior art, and does not represent a parasitic load imposed by the condensate scrubber.

Small steam jet ejector 42 provides the essential pressure boost needed to convey part of the condenser vent gas to gas absorber 46, move the gas through gas absorber 46, and ultimately convey the remainder of this vent gas not absorbed to primary $H_2S$ abatement system 26. In principle another kind of vacuum pump or compressor might be used for this purpose, but a steam jet ejector is preferred because of small capital and maintenance costs. Also, the steam that powers the gas ejector increases the enthalpy of the gas, whereby the enthalpy and temperature of the condensate are increased, a greater volume of vapor is separated from the condensate in gas separator 62, and $H_2S$ is more thoroughly removed from the condensate.

Figure 4:
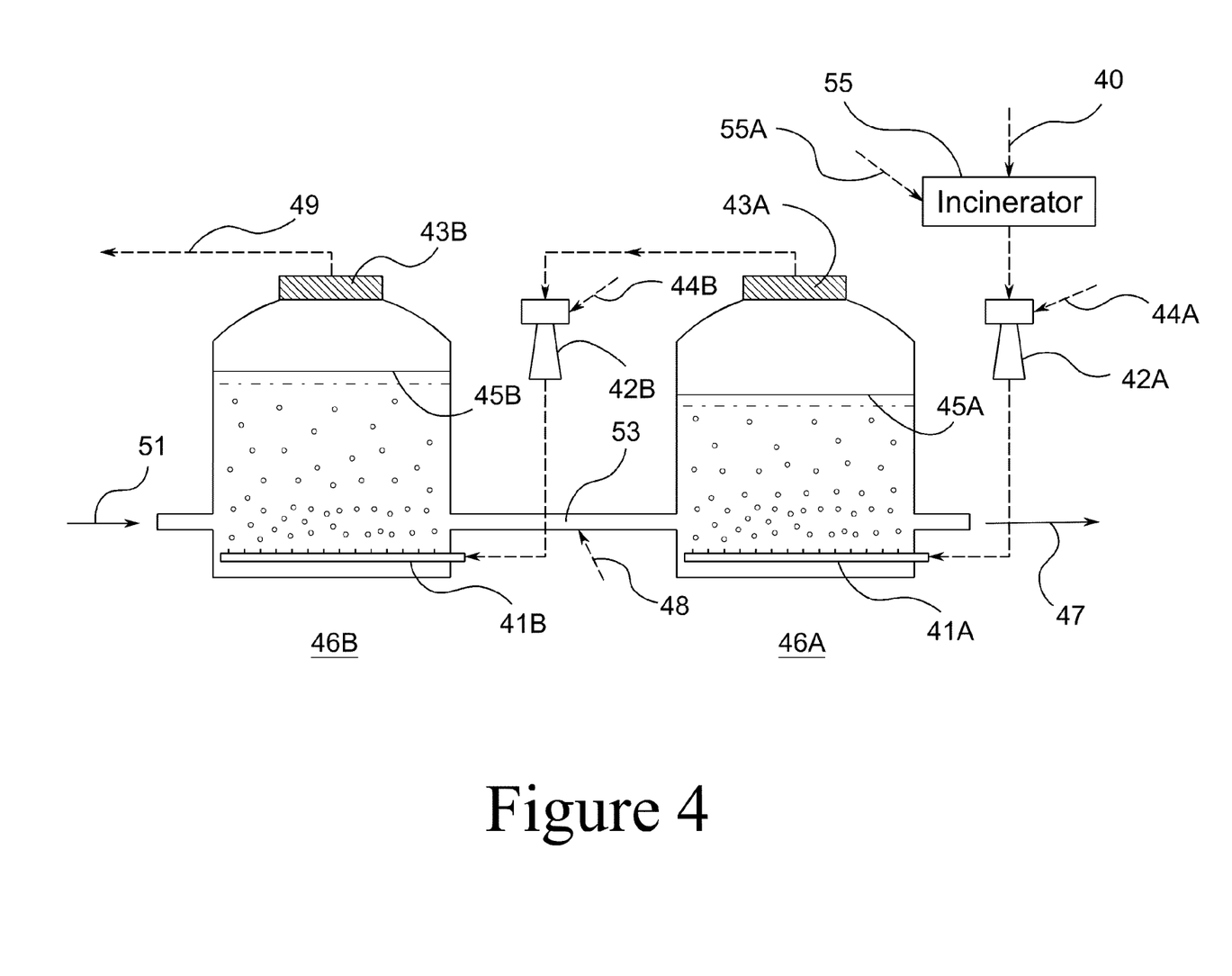
FIG. 4 depicts the preferred embodiment of the gas absorber subsystem of the condensate scrubber, comprising two steam jet ejectors to compress and transport the vent gas, and two tanks sparged with the vent gas allowing $CO_2$ to dissolve in the condensate.
Figure 5:
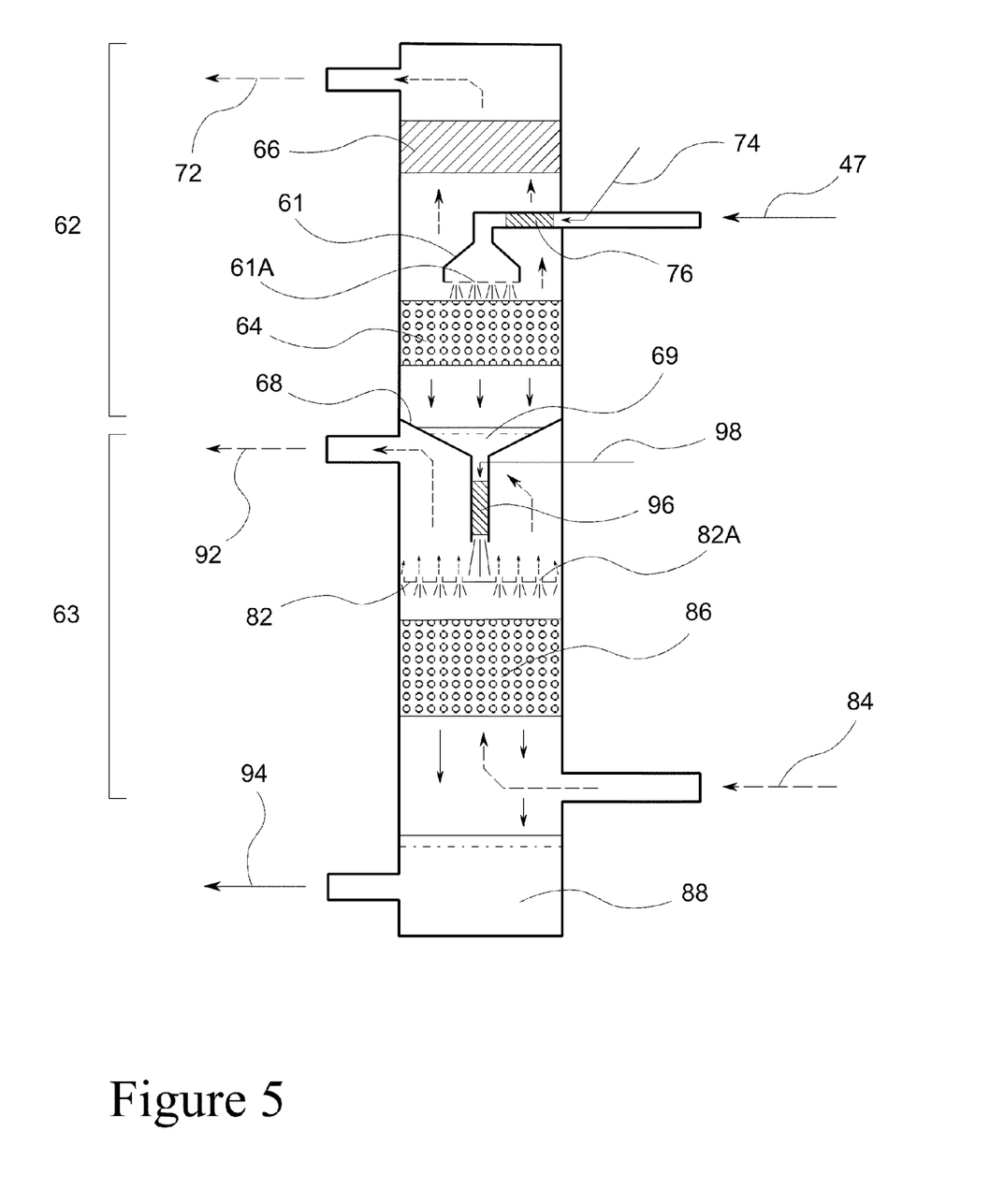
FIG. 5 depicts an embodiment of the gas separator subsystem of the condensate scrubber wherein acid can be added to decrease condensate pH.

Each arrow is labeled with a number that represents the percentage of total $H_2S$ entering the power generating unit that is carried by that flow. These values were calculated in reference to the embodiment of the invention as depicted in FIGS. 3, 4 and 5 with operating values of pressure and residence time as specified in Table 3, using the steam composition in Table 1, and no $SO_2$ or other acid added.

In the preferred embodiment of the invention incinerator 55 is provided which converts the $H_2S$ in the vent gas that goes to the gas absorber to $SO_2$. In this embodiment $H_2S$ is much more thoroughly removed from the condensate without need for acid supplied from without the power generating unit.

Figure 3:
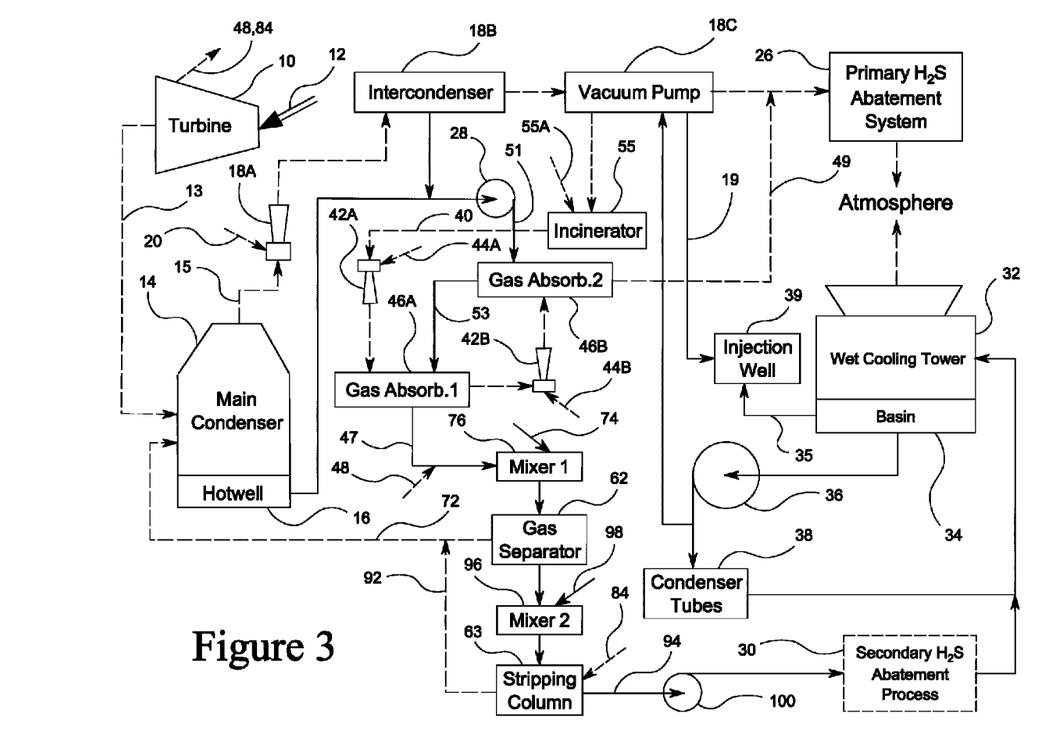
FIG. 3 depicts in greater detail a power generating unit equipped with the preferred embodiment of the condensate scrubber.

FIG. 3 illustrates the invention in greater detail. In a typical modern steam cycle geothermal power generating unit the gas ejector system comprises a single stage steam jet ejector 18A with intercondenser 18B, followed by vacuum pump 18C (prior art). Gas ejector 18A extracts noncondensible gases 15 from main condenser 14 together with a small amount of water vapor. Because the small stream of seal water 19 flowing out of vacuum pump 18C contains the highest concentration of $H_2S$ in the entire power generating unit, it is advantageously diverted directly to injection well 39 together with cooling tower blowdown 35 (prior art).

In the preferred embodiment of the invention, incinerator 55 converts the $H_2S$ in noncondensible gas 40 to $SO_2$ which dissolves in condensate 53 lowering the pH of the condensate whereby more $H_2S$ is released from solution. Air 55A or oxygen must be provided to incinerator 55 in an amount sufficient to enable complete conversion of $H_2S$ to $SO_2$. Any one of a variety of incinerator types can serve this function; for example, a simple combustor (if the vent gas has sufficient fuel value), a regenerative thermal oxidation unit, a recuperative thermal oxidation unit, or a catalytic incinerator as provided by Haas, U.S. Pat. No. 4,171,347.

In the preferred embodiment of the invention gas absorber 46 comprises at least two stages 46B and 46A through which a portion of the condenser vent gas 40 flows countercurrent to condensate 51. Countercurrent gas absorption maximizes the amount of $CO_2$ absorbed from vent gas 40 thereby minimizing the volume of vent gas that must be passed through the gas absorber. Each gas absorber stage 46B and 46A is provided with a separate steam jet ejector 42A and 42B to move vent gas 40 through it.

Because the volume of vent gas 40 moved is small and the pressure increase required at each stage is modest, the amount of motive steam 44A and 44B that needs be provided to small steam jet ejectors 42A and 42B is small, and the resulting increase in the temperature of condensate 47 leaving the gas absorber system is also small. Advantageously, additional steam 48 may be added to condensate 47 to further increase the temperature of the condensate, whereby a larger fraction of dissolved $H_2S$ will be removed when condensate 47 is flashed down to main condenser pressure in gas separator 62. While a relatively small amount of high pressure steam diverted from turbine steam supply 12 is needed to power small steam jet ejectors 42A and 42B, steam at lower pressure extracted from turbine 10 between turbine stages can be used to increase the temperature of condensate 47. So doing decreases the power cost of diverting steam 48 to heat condensate 47 because the steam diverted has already done some work.

Because steam 12 entering turbine 10 of a geothermal power generating unit commonly is close to saturation, the first moisture appears just after the first stage of the turbine, and more moisture condenses as the steam flows through the turbine, significantly decreasing the energy conversion efficiency of the low pressure turbine stages. Advantageously and most conveniently steam is extracted from turbine 10 around its circumference adjacent to the tips of the turbine blades. Because centrifugal force causes the moisture to be concentrated near the tips of the blades, extracting a small amount of steam from the circumference of the turbine removes a much larger proportion of the moisture from the turbine together with the steam, and decreasing moisture content increases the energy conversion efficiency of the turbine stages downstream. As a result, extracting steam 48 from the turbine to heat condensate 47 decreases power generated by an amount that is less than proportional to the amount of steam extracted.

Optionally, mixer 76 may be used to add a small amount of sulfur dioxide or another acid 74—for example, sulfuric acid which is inexpensive and produces relatively noncorrosive salts when neutralized—to condensate 47, thereby further decreasing pH and increasing the amount of $H_2S$ that is removed from the condensate in gas separator 62.

Essentially, gas separator 62 is a flash chamber and stripper column operated at the same pressure as main condenser 14 and connected to main condenser 14 with a conduit for vapor 72. Condensate 47 separates into two phase in gas separator 62, and vapor phase 72, which contains most of the $H_2S$ that was in condensate 47, flows into main condenser 14 where it combines with steam 13 flowing out of turbine 10.

Advantageously, steam stripping column 63 can be provided to strip additional $H_2S$ 92 from the condensate. Advantageously and for reasons recited above, steam 84 provided to stripping column 63 is also extracted from turbine 10 between stages.

Optionally, second mixer 96 can be provided to add $SO_2$ or another acid 98 to the condensate as it enters stripping column 63 whereby even more $H_2S$ is removed from condensate 94. Second condensate pump 100 brings condensate 94 up to a pressure greater than atmospheric and conveys it to secondary $H_2S$ abatement process 30 (which is now optional) and cooling tower 32.

FIG. 4 illustrates the preferred embodiment of the gas absorber portion of the condensate scrubber where steam condensate is contacted with condenser vent gas. For reasons set forth above, it is advantageous to employ two or more gas absorber stages 46B and 46A with condenser vent gas 40 flowing through them countercurrent to condensate 51.

Preferably, each gas absorber stage 46B, 46A is a tank filled with condensate which is sparged with condenser vent gas 40, because a tank provides time for the hydration reaction of $CO_2$ (reaction 2 above) to approach equilibrium at each stage. The gas entering a tank type absorber near to its bottom must be compressed sufficiently to overcome hydrostatic pressure and to be dispersed as small bubbles in the liquid. Therefore, two steam jet ejectors 42A and 42B are advantageously provided to propel vent gas 40 through absorber tanks 46A and 46B. The gas entering each gas absorber 46A and 46B is dispersed into fine bubbles through gas diffusers 41A and 41B. Condensate 51 enters second gas absorber stage 46B propelled by first condensate pump 28 (in FIG. 3) at sufficient pressure to maintain liquid level 45B, and flows by gravity from second gas absorber stage 46B to first gas absorber stage 46A wherein liquid level 45A is lower than liquid level 45B. Optionally, mist scrubbers 43A and 43B can be provided to remove liquid droplets carried by the gases exiting gas absorber tanks 46A and 46B, whereby erosion of second small steam jet ejector 42B and accumulation of liquid in pipes downstream are minimized.

FIG. 5 illustrates the design of the gas separator section of the condensate scrubber that is most advantageous when acid 74 and acid 98 are added to the condensate. Condensate 47 from first stage gas absorber 46A enters gas separator 62 through spray head 61 having orifices 61A which distribute the condensate over first packed column section 64 which is filled with Raschig rings or similar packing material. Orifices 61A are sized such that most of the pressure drop between first stage gas absorber 46A and gas separator 62 takes place at orifices 61A, whereby separation of vapor from liquid commences as condensate 47 passes through orifices 61A. First packed column section 64 improves separation of vapor from liquid, and should be sized to provide at least one mass transfer unit. Mist catcher 66 removes water droplets from vapor 72 flowing out of gas separator 62.

Mixer 74 preferably is an in-line mixer which ensures very rapid and thorough mixing of acid 74 with condensate 47. Bottom part 68 of gas separator 62 preferably is cone shaped, allowing clean separation of vapor from condensate 69 which collects in bottom part 68.

In-line mixer 74 and spray head 61 are designed to minimize the transit time of condensate 47 from the point acid 74 is added to condensate 47 to where vapor begins to separate from it upon exiting orifices 61A. The shortest possible transit time is desired because the reaction of acid 74 with bisulfide ion in condensate 47 converting it to $H_2S$ and the reaction of acid 74 with bicarbonate ion converting it to carbonic acid $H_2CO_3$ are limited only by the rate of mixing within in-line mixer 74 and therefore practically instantaneous. The pH of condensate 47 when acid 74 is added to it is buffered only by these reactions and decreases significantly. Subsequently, the carbonic acid thus formed decomposes to release $CO_2$ and pH increases, but this reaction is much slower. Therefore, it is desirable to separate vapor from the condensate as soon as possible after complete mixing is achieved, before the pH of the condensate has time to increase, converting part of the $H_2S$ back to bisulfide ion.

Optionally, stripping column 63 can be added to the condensate scrubber system to remove additional $H_2S$ from condensate 69 flowing out of bottom part 68 of gas separator 62. Additional acid 98 can be added to condensate 69 and second in-line mixer 96 is provided to ensure thorough mixing of acid 98 with condensate 69. Perforated tray 82 evenly distributes the condensate over the top of second packed column section 86 where the condensate meets steam 84 in a counter-flowing manner, whereby additional $H_2S$ is stripped from the condensate. Second packed column section 86 is filled with Raschig rings or similar packing material, and preferably is designed provide at least one transfer unit. Perforated tray 82 is designed to allow flow of vapor up through the perforations while condensate flows down through the perforations; this counterflow is enabled by providing risers 82A with serrated upper edges which tend to equalize liquid flow through each perforation, and diameter large enough to allow vapor to flow up through them with a minimal pressure drop.

For reasons set forth above, in order to maximize the amount of $H_2S$ stripped from the condensate, in-line mixer 96 and perforated tray 82 are designed to minimize transit time from the point that acid 98 is added to condensate 69 to the point at which the falling condensate effectively meets up-flowing steam at the top of second packed column section 86.

The steam stripped condensate accumulates in hot well 88 and is removed 94 from steam stripper 63 by the action of second condensate pump 100.

Figure 6:
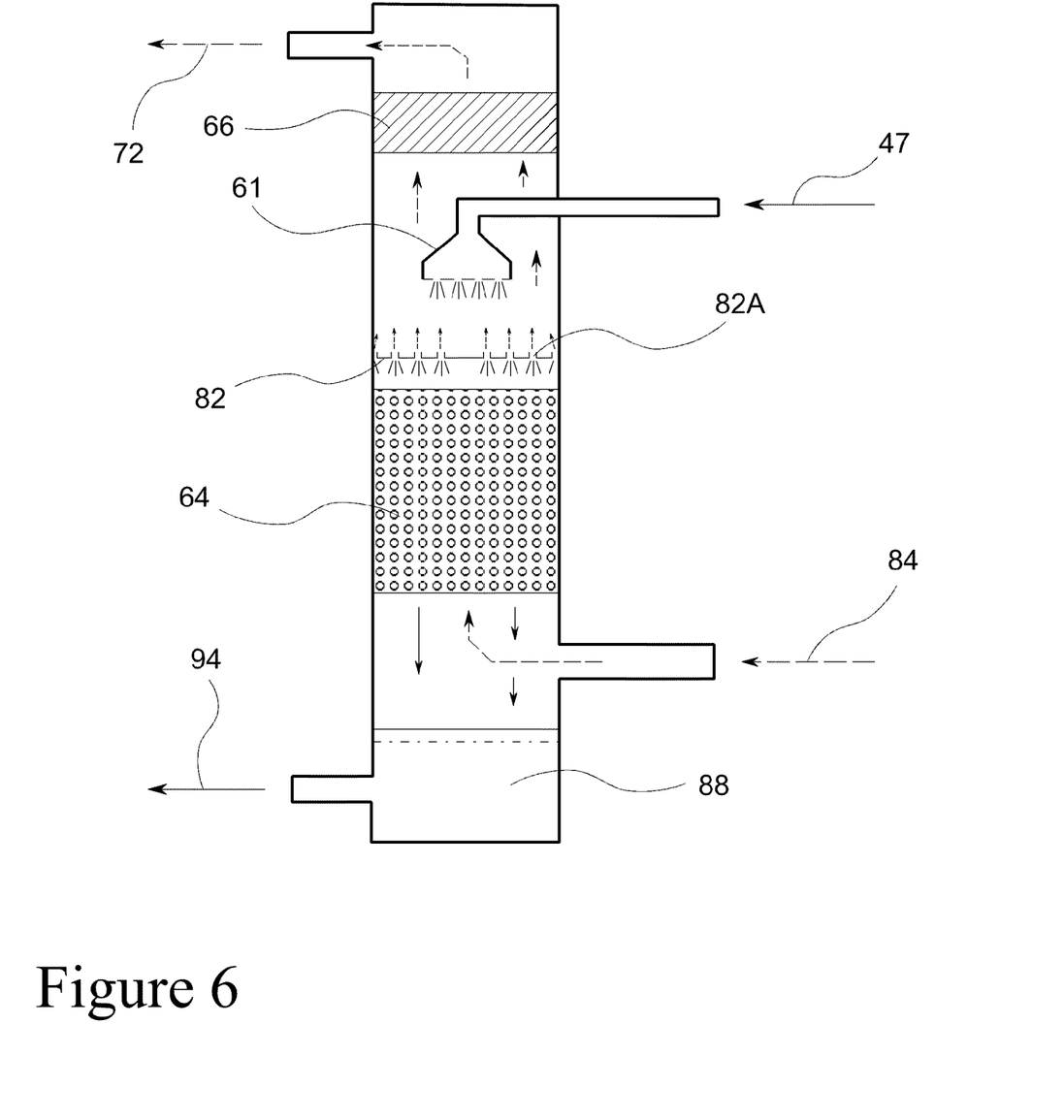
FIG. 6 depicts a simpler embodiment of the gas separator subsystem which is advantageously employed when an incinerator is used to convert $H_2S$ in the recirculated condenser vent gas to $SO_2$; that is, as part of the preferred embodiment of the invention.

In the preferred embodiment of the invention incinerator 55 produces $SO_2$ and no additional acid 74 or 98 needs to be added to the condensate. In this case mixers 76 and 96 are not needed, and the gas separator system depicted in FIG. 5 can advantageously be replaced with the simpler device depicted in FIG. 6.

Operation of the Invention

Operation of the invention was modeled using the computer program CNDSR, which was specifically developed to model partitioning of $H_2S$ and other gases in the condensers and cooling water system of a geothermal power generating unit (Weres, Geothermics, Vol. 12, pp. 1-15, 1983; Weres, Geothermics, Vol. 13, pp. 293-304, 1984; Weres, Geothermics, Vol. 13, pp. 305-318, 1984).

The steam composition assumed in modeling the invention is presented in Table 1, and Table 2 summarizes the fate of $H_2S$ entering the power generating unit under several different scenarios. "Prior Art" represents a typical modern steam cycle geothermal power generating unit equipped with a surface condenser and a primary $H_2S$ abatement system. In this case, which FIG. 1 is based on, 34.2 percent of the $H_2S$ must be destroyed by the secondary abatement process or else would be emitted to the atmosphere.

"Invention" refers to basically the same power generating unit, but equipped with a condensate scrubber and wherein 20% of the condenser vent gas is provided to the condensate scrubber. The "No Acid" case, which FIG. 2 is based on, represents operation of the invention without addition of acid 74 or acid 98 to the condensate, and with no conversion of $H_2S$ to $SO_2$. In this case, the amount of $H_2S$ that must be destroyed by the secondary abatement process is reduced to 2.5% whereby the cost and inconvenience of secondary abatement will be small if, indeed, secondary abatement is still needed to meet regulatory requirements.

The case labeled "$H_2SO_4$" assumes that sulfuric acid is added to the condensate in an amount equal to 1.5 mg-moles per kg of turbine steam flow (147 ppm), equally divided between injection points 74 and 98. In this case, secondary abatement probably would be unnecessary, as only 0.41% of the $H_2S$ would be emitted to the atmosphere without it.

In the case labeled "$SO_2$," incinerator 55 converts the $H_2S$ in recirculated vent gas 40 to $SO_2$, and air 55A sufficient to provide a 40% stoichiometric excess of oxygen is supplied to the incinerator. In this case, only 0.23% of the $H_2S$ coming into the power generating unit is emitted to the atmosphere, and secondary abatement certainly would not be necessary. Because $SO_2$ is more soluble by several orders of magnitude than $H_2S$ at cooling water pH and would quickly be oxidized by reaction with oxygen dissolved in the cooling water, the amount of $SO_2$ emitted to the atmosphere is at least one hundred times smaller than the small amount of $H_2S$ emitted.

Table 3 summarizes the values of pressure and residence time of liquid in various parts of the power generating unit and condensate scrubber. These values are parameters that characterize the design of the power generating unit, and were specified in constructing the computer models. The values of temperature and pH were calculated.

In the "No Acid" case, condensate pH values in the main condenser and intercondenser are slightly lower than in the "Prior Art" case, while cooling water pH is substantially higher, because more $CO_2$ and $H_2S$ is removed from the condensate before it is added to the cooling water. The lowest pH in the entire system is 6.27 in first gas absorber tank 46A.

With sulfuric acid added, the lowest pH in the system is 5.94 in first mixer 76. In the "$SO_2$" case, the pH in some parts of the system is actually greater than with "No Acid"; this increase is due to the fact that the air added to vent gas 40 to convert $H_2S$ to $SO_2$ increases the vaport-to-liquid volume ratios in gas absorber tanks 46A and 46B, whereby less $CO_2$ is absorbed. Of course, oxidation of $SO_2$ to sulfuric acid in the cooling water decreases cooling water pH relative to the "No Acid" case, but the pH of the cooling water coming from the cooling tower is still greater than in the "Prior Art" case.

Thus, the amount of sulfuric acid or $SO_2$ that needs be added to the condensate to virtually eliminate $H_2S$ emissions to the atmosphere will not decrease pH values to the degree that corrosion will become a significant problem.

The power needed to operate second condensate pump 100, and the potential power generation lost by increasing steam supply to jet ejector 18B, supplying steam 44A and 44B to power small jet ejectors 42A and 42B, and extracting steam 48 and 84 from the turbine to heat and steam strip the condensate will together represent the major operating costs of the invention. The power consumed, and potential power generation lost can be considered parasitic loads. The results of this calculation are summarized in Table 4. It was assumed that the beneficial results of extracting a disproportionate amount of moisture from the turbine will decrease the power lost due to extracting steam from the turbine by 30%. In the "No Acid" case or with sulfuric acid, the effective parasitic load imposed is estimated to be 0.98%. The parasitic load is about 0.90% when using incinerator 55 to produce $SO_2$ because less $CO_2$ is recirculated to the main condenser in this case.

These parasitic loads can be decreased by optimizing operating parameters. The largest parasitic load is the additional steam consumed by jet ejector 18B due to recirculation of part of the vent gas. As a practical matter, some power generating units operate with more steam supplied to the jet ejector 18B than is necessary; in this case, increasing the load on the gas ejector system by a few percent would not require a commensurate increase in motive steam consumed.

Conclusions and Ramifications

This invention will allow the partitioning of $H_2S$ in a steam cycle geothermal power generating unit to be improved to the point that secondary $H_2S$ abatement is no longer necessary.

Adding the condensate scrubber to a power generating unit in which an incinerator serves as part the primary $H_2S$ abatement system would be especially convenient. In this case, no additional incinerator 55 would be needed, because part of the gas from the primary $H_{2S}$ abatement system containing $SO_2$ would be provided to the gas absorber.

By greatly reducing the amount of $H_2S$ added to the cooling water and thereby reducing or completely eliminating the need to add chelated iron to the cooling water, the condensate scrubber will substantially decrease the accumulation of iron oxides, colloidal sulfur, and biomass in the cooling water system. This beneficial change will make it much easier to keep the condenser tubes and cooling tower fill clean. The resulting increase in thermodynamic efficiency and decreased down time will more than compensate for the modest parasitic load imposed by the condensate scrubber.

While the embodiments described herein refer to a specific, typical power generating unit configuration, the invention can be implemented in power generating units of different design.

For example, the invention can be implemented in a power generating unit that employs an additional steam jet ejector in place of vacuum pump 18C or in a power generating unit that does not dispose of any untreated condensate directly to injection well 39.

Most beneficially, substantially all of the steam condensate which is used for cooling tower make-up should treated, and certainly at least one-half of the steam condensate coming out of the main condenser should be contacted with the condenser vent gas and treated.

While steam jet ejectors 42 (referring to FIG. 2) are considered the best suited means for moving the condenser vent gas to and through gas absorber 46, other gas propelling means could also be employed for this purpose; for example, mechanical compressors or blowers. Because the amount of $CO_2$ that dissolves in the condensate increases with the pressure in gas absorber 46, it is preferred that the condenser vent gas be pushed through the absorber at a pressure somewhat above atmospheric. However, the vent gas could also be pulled through the absorber, using a steam jet ejector or blower at the outlet of the absorber to pull it out of the absorber and push it towards primary $H_2S$ abatement system 26 after it leaves the gas absorber.

Using sparged tanks as illustrated in FIG. 4 to contact the steam condensate with condenser vent gas is preferred, because tanks of conveniently small size would provide the residence time needed for $CO_2$ to react with water to produce carbonic acid and decrease pH before the condensate is exposed to the second, lower pressure in gas separator 62. However, an absorber column or tower of conventional design could also be used for this purpose.

The gas absorber is most beneficially operated at a pressure above atmospheric but no more than twice the ambient atmospheric pressure. Increasing absorber pressure beyond that would bring diminishing returns while increasing the power required to pump the condensate into the absorber and increasing the steam or power required to compress the condenser vent gas.

Using untreated condenser vent gas (that is, condenser vent gas that has not yet passed through the primary $H_2S$ abatement system) to acidify the condensate is preferred, because using treated condenser vent gas (that is, coming out of the primary $H_2S$ abatement system with some amount of air added to it) would increase the load on the primary $H_2S$ abatement system in terms of gas volume being treated. However, treated vent gas could also be used, and certainly would be used in case the primary $H_2S$ abatement system is an incinerator that destroys the $H_2S$ in the vent gas by converting it to $SO_2$.

In the example presented, 20% of the condenser vent gas is contacted with the condensate. This percentage is subject to optimization, and actual percentage preselected will depend on the concentration of $CO_2$ in the condenser vent gas, the amount of $CO_2$ that needs to be added to the condensate to convert most of the bisulfide ion to $H_2S$, and the pressure in the gas absorber along with other factors. However, in most cases less than one-half of the condenser vent gas will suffice.

The simplest way to depressurize the acidified condensate to strip out the $H_2S$ is to expose it to condenser vacuum. This is most conveniently accomplished using a separator in the form of a separate vessel connected to the vacuum chamber of the main condenser through a conduit large enough to allow the vapor separated from the condensate to flow to the main condenser with a minimal drop in pressure. Ideally, the pressure in the gas separator should be substantially equal to the operating pressure inside the main condenser, and in no event should the gas separator be operated at twice the main condenser pressure or above.

The gas separator can also be incorporated in the main condenser itself, by installing it inside the vacuum chamber of the main condenser. In order to avoid interference with steam flow from the turbine into the separator, the gas separator should not be installed above any one of the tube bundles, and, of course, mixing of the treated condensate with untreated condensate should be avoided.

TABLE 1

Steam Composition Modeled

| Parameter | Units | |
|---|---|---|
| Total Gas Content | weight % | 0.9 |
| $H_2S$ in steam | mg/kg-$H_2O$ | 596 |
| $NH_3/H_2S$ | mole ratio | 1.05 |
| $H_2S$ in steam | mmole/kg-$H_2O$ | 17.52 |
| $NH_3$ | same | 18.33 |
| $CO_2$ | same | 174.20 |
| $CH_4 + H_2$ | same | 68.66 |
| Total Gas Content | same | 278.70 |

TABLE 2

Fate of Hydrogen Sulfide entering the Power Generating Unit

| | | Invention | | |
|---|---|---|---|---|
| | Prior Art | No acid | $H_2SO_4$ | $SO_2$ |
| Disposed to injection well 39 with vacuum pump seal water 19 | 9.6 | 10.1 | 9.6 | 9.1 |
| Converted to $SO_2$ by incinerator 55 | 0.0 | 0.0 | 0.0 | 14.7 |
| Destroyed in primary $H_2S$ abatement system 26 | 56.2 | 87.4 | 90.0 | 76.0 |
| Destroyed by secondary $H_2S$ abatement process 30 or emitted to the atmosphere | 34.2 | 2.5 | 0.41 | 0.23 |

Tabulated values are percentages relative to total hydrogen sulfide entering the power plant.

TABLE 3

Values in Computer Models, Specified and Calculated

| | | | | Invention | | | Prior Art | |
|---|---|---|---|---|---|---|---|---|
| | | $t_{res}$ | P | T | | pH | T | |
| Unit | Label | (s) | (mbar) | (° C.) | No Acid | $H_2SO_4$ (a) | $SO_2$ (b) | (° C.) | pH |
| Main Condenser | 14, 16 | 2 | 70 | 38.4 | 8.90 | 8.90 | 8.93 | 38.6 | 9.04 |
| Intercondenser | 18B | 2 | 183 | 48.5 | 8.42 | 8.41 | 8.47 | 49.1 | 8.55 |
| Gas Absorber 1 | 46A | 60 | 1100 | 41.9 | 6.27 | 6.26 | 6.33 | | |
| Gas Absorber 2 | 46B | 60 | 1100 | 40.3 | 6.56 | 6.54 | 6.75 | | |
| Mixer 1 | 76 | 0.3 | 900 | 41.9 | 6.27 | 5.94 | | | |

TABLE 3-continued

Values in Computer Models, Specified and Calculated

| | | | | | Invention | | | Prior Art | |
|---|---|---|---|---|---|---|---|---|---|
| | | $t_{res}$ | P | T | pH | | | T | |
| Unit | Label | (s) | (mbar) | (° C.) | No Acid | $H_2SO_4$ (a) | $SO_2$ (b) | (° C.) | pH |
| Gas Separator | 62 | 1.0 | 73 | 38.6 | 7.73 | 7.46 | 7.29 | | |
| Mixer 2 | 96 | 0.3 | 73 | 38.6 | 7.74 | 6.23 | | | |
| Stripping Column | 63 | 1.0 | 73 | 39.6 | 7.95 | 7.07 | | | |
| Cooling Water to Cooling Tower | | | | 32.1 | 7.90 | 7.51 | 7.26 | 31.9 | 7.27 |
| Cooling Water from Cooling Tower | | | | 20.6 | 8.13 | 7.76 | 7.51 | 20.6 | 7.29 |

Values of residence time and pressure specified; values of temperature and pH calculated.
Fraction of condenser vent gas provided to gas absorber section is 20%.
(a) Sulfuric acid applied = 1.5 mmoles/kg turbine steam flow, equally divided between Mixer 1 and Mixer 2.
(b) Hydrogen sulfide in gas recirculated to gas absorbers converted to $SO_2$ in catalytic converter 53; 40% excess air provided.

TABLE 4

Steam and power required to operate the invention

| | Amount in Relation to Turbine Steam Flow (%) | | Effective Parasitic Load (%) | |
|---|---|---|---|---|
| | $H_2SO_4$ (a) or No Acid | $SO_2$ (b) | $H_2SO_4$ (a) or No Acid | $SO_2$ (b) |
| Additional steam at 4.7 bar to primary gas ejector 18A needed to remove recirculated gases from main condenser. | 0.35 | 0.24 | 0.35 | 0.24 |
| Steam 44A and 44B at 4.7 bar to power small jet ejectors 42A and 42B which move recirculated gases 40 through gas absorbers 46A and 46B. | 0.14 | 0.20 | 0.14 | 0.20 |
| Steam 48 at 1.4 bar to increase temperature of the condensate; see note (c) below. | 0.38 | 0.32 | 0.18 | 0.15 |
| Steam 84 at 0.8 bar to steam strip condensate; see note (c) below. | 0.55 | 0.55 | 0.20 | 0.20 |
| Power to drive condensate pump 28 at 12.2 m head and 23% energy efficiency as percentage of Gross Power Generated. | 0.11 | 0.11 | 0.11 | 0.11 |
| Total Effective Parasitic Load as Percentage of Gross Power Generated (%) | | | 0.98 | 0.90 |

Notes (a) and (b) same as for Table 3.
(c) The effective parasitic load was estimated assuming that moisture related effects decrease loss of power caused by withdrawing steam from the turbine by 30%.

The invention claimed is:

1. A method for removing hydrogen sulfide from steam condensate in a geothermal power generating unit comprising:
   (a) extracting a first steam condensate from a surface-type main condenser, the first steam condensate including dissolved hydrogen sulfide and ammonia, and
   (b) extracting a condenser vent gas through a gas ejector system, the condenser vent gas comprising carbon dioxide, and
   (c) contacting a predetermined portion of the first steam condensate with a predetermined portion of the condenser vent gas under a first pressure to produce a second steam condensate;
   (d) exposing the second steam condensate to a second pressure, the second pressure being sufficiently low to produce a mixed stream of a third steam condensate and a vapor phase under the second pressure;
   (e) separating the mixed stream into a third steam condensate stream and a vapor phase stream; and
   (f) providing a portion of the third steam condensate to a cooling tower as make up water.

2. The method according to claim 1, wherein:
the predetermined portion of the first steam condensate is at least one-half of the first steam condensate.

3. The method according to claim 1, wherein:
the main condenser is characterized by an operating pressure and further wherein the second pressure is less than twice the operating pressure.

4. The method according to claim 3, wherein:
the first pressure is not more than twice the ambient atmospheric pressure.

5. The method according to claim 3, further comprising:
adding an acidic substance to the first steam condensate.

6. The method according to claim 5, wherein:
the acidic substance is sulfur dioxide.

7. The method according to claim 6, wherein:
the sulfur dioxide is derived from hydrogen sulfide in the condenser vent gas.

8. The method according to claim 3, further comprising:
extracting supplemental steam from between adjacent stages of a steam turbine; and
combining the supplemental steam with the second steam condensate to form a modified second steam condensate.

9. The method according to claim 4, wherein:
the third steam condensate comprises all of the steam condensate which is used as cooling tower make-up water.

10. The method according to claim 9, wherein:
the second pressure is equal to the operating pressure of the main condenser.

11. A geothermal power generating unit comprising:

(a) a surface-type main condenser arranged and configured for producing a first steam condensate, the first steam condensate containing dissolved hydrogen sulfide and ammonia;

(b) a gas ejector system arranged and configured for extracting a condenser vent gas that includes carbon dioxide;

(c) a cooling tower arranged and configured for receiving a steam condensate stream for make-up water;

(d) means for contacting a predetermined portion of the first steam condensate with a predetermined portion of the condenser vent gas to produce a second steam condensate;

(e) means for exposing the second steam condensate to a second pressure sufficiently low to produce a mixed stream of a third steam condensate and a vapor phase;

(f) means for separating the third steam condensate from the vapor phase into a third steam condensate stream and a vapor stream; and (g) means for conveying the third stream condensate stream to the cooling tower as make-up water.

12. The geothermal power generating unit of claim 11, wherein:

the exposing means are located outside of the vacuum chamber.

13. The geothermal power generating unit of claim 11, further comprising means to deliver at least one-half of the first condensate to the location where it is contacted with the condenser vent gas.

14. The geothermal power generating unit of claim 13, wherein the geothermal power generating unit further comprises (a) at least one condensate pump for bringing the first steam condensate up to the first pressure before it enters the contacting means, and (b) at least one additional condensate pump for pumping the second steam condensate after it leaves the exposing means, and (c) wherein the additional condensate pump moves the third condensate towards the cooling tower.

15. The geothermal power generating unit of claim 14, wherein the contacting means comprises one or more sparged tanks.

16. The geothermal power generating unit of claim 15, further comprising additional gas propelling means external to the gas ejector system for moving the condenser vent gas through the contacting means.

17. The geothermal power generating unit of claim 16, wherein the gas propelling means comprise steam jet ejectors.

18. The geothermal power generating unit of claim 14, further comprising means for converting hydrogen sulfide in the condenser vent gas to sulfur dioxide.

19. The geothermal power generating unit of claim 14, further having a steam turbine comprising stages and means for extracting from the steam turbine between the stages a predetermined amount of steam which is subsequently combined with the first steam condensate.

20. The geothermal power generating unit of claim 14, wherein the third steam condensate comprises all of the steam condensate which is provided to the cooling tower as make-up water.

* * * * *